US008656737B2

(12) United States Patent
Nakamura et al.

(10) Patent No.: US 8,656,737 B2
(45) Date of Patent: Feb. 25, 2014

(54) GLASS FILM RIBBON PRODUCTION METHOD AND GLASS FILM RIBBON PRODUCTION APPARATUS (75) Inventors: Takahide Nakamura, Otsu (JP);
Katsutoshi Fujiwara, Otsu (JP);
Michiharu Eta, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 13/274,473

(22) Filed: Oct. 17, 2011

(65) Prior Publication Data

US 2012/0090357 A1   Apr. 19, 2012

(30) Foreign Application Priority Data

Oct. 19, 2010   (JP) ................................. 2010-234521

(51) Int. Cl.
*C03B 25/12* (2006.01)
*C03B 17/06* (2006.01)

(52) U.S. Cl.
USPC ............................ 65/96; 65/92; 65/93; 65/94

(58) Field of Classification Search
USPC ............... 65/90–101, 253–257; 164/454–480
See application file for complete search history.

(56) References Cited

U.S. PATENT DOCUMENTS

| | | | | | |
|---|---|---|---|---|---|
| 1,499,406 | A | * | 7/1924 | Rowley | 65/83 |
| 1,753,768 | A | * | 4/1930 | Blair | 65/195 |
| 1,836,394 | A | * | 12/1931 | Reece | 65/53 |
| 1,891,373 | A | * | 12/1932 | Danner | 65/92 |
| 2,057,357 | A | * | 10/1936 | Amsler | 65/91 |
| 2,177,324 | A | * | 10/1939 | Long | 65/112 |
| 2,457,785 | A | * | 12/1948 | Slayter et al. | 65/181 |
| 3,165,391 | A | * | 1/1965 | Schmid | 65/168 |
| 3,275,429 | A | * | 9/1966 | Javaux | 65/185 |
| 3,351,446 | A | * | 11/1967 | Pilkington et al. | 65/32.5 |
| 3,740,205 | A | * | 6/1973 | Cayphas et al. | 65/25.4 |
| 3,775,080 | A | * | 11/1973 | Brichard | 65/95 |

(Continued)

FOREIGN PATENT DOCUMENTS

| | | |
|---|---|---|
| JP | 2001-31435 | 2/2001 |
| JP | 2007-051027 | 3/2007 |

(Continued)

OTHER PUBLICATIONS

International Search Report issued Jan. 10, 2012 in corresponding International (PCT) Application No. PCT/JP2011/073653.

(Continued)

*Primary Examiner* — Jodi C Franklin
(74) *Attorney, Agent, or Firm* — Wenderoth, Lind & Ponack, L.L.P.

(57) ABSTRACT

After a glass film ribbon is formed while allowing a glass to descend, the glass film ribbon is annealed while allowing the glass film ribbon to descend in an annealer to remove an internal strain. Then, when the glass film ribbon having a thickness at a center portion excluding both widthwise ends of 300 μm or less is cut, after processing in the annealer is executed and before a cutting step is executed, main tensile rollers that play a role as principal tensile rollers hold the descending glass film ribbon and are driven to rotate, to thereby provide at least the glass film ribbon in the annealer with tension in a vertical direction.

10 Claims, 4 Drawing Sheets

(56) References Cited

U.S. PATENT DOCUMENTS

| | | | |
|---|---|---|---|
| 4,108,714 A * | 8/1978 | Keller et al. | 264/213 |
| 5,350,009 A * | 9/1994 | Mizoguchi et al. | 164/454 |
| 5,901,777 A * | 5/1999 | Matsumura et al. | 164/475 |
| 6,273,178 B1 * | 8/2001 | Osada et al. | 164/480 |
| 6,322,860 B1 * | 11/2001 | Stein et al. | 428/1.26 |
| 6,758,064 B1 | 7/2004 | Kariya | |
| 6,815,070 B1 * | 11/2004 | Burkle et al. | 428/425.6 |
| 7,156,150 B2 * | 1/2007 | Zahedi et al. | 164/480 |
| 7,323,135 B2 * | 1/2008 | Choi et al. | 266/90 |
| 7,888,158 B1 * | 2/2011 | Sears, Jr. | 438/61 |
| 2004/0065115 A1 * | 4/2004 | Mueller et al. | 65/29.17 |
| 2005/0103054 A1 * | 5/2005 | Shiraishi et al. | 65/90 |
| 2007/0056323 A1 * | 3/2007 | Pitbladdo | 65/90 |
| 2007/0130994 A1 * | 6/2007 | Boratav et al. | 65/29.21 |
| 2008/0184741 A1 * | 8/2008 | Mueller et al. | 65/29.14 |
| 2009/0217704 A1 * | 9/2009 | Shiraishi et al. | 65/91 |
| 2009/0314032 A1 * | 12/2009 | Tomamoto et al. | 65/29.14 |
| 2010/0031702 A1 * | 2/2010 | Tomamoto et al. | 65/91 |
| 2010/0162763 A1 * | 7/2010 | Pitbladdo | 65/90 |
| 2010/0269542 A1 * | 10/2010 | Nishiura et al. | 65/95 |
| 2010/0281920 A1 | 11/2010 | Nishiura et al. | |
| 2011/0197633 A1 * | 8/2011 | Tomamoto et al. | 65/94 |
| 2011/0197634 A1 * | 8/2011 | Eta | 65/97 |
| 2011/0200812 A1 | 8/2011 | Tomamoto et al. | |

FOREIGN PATENT DOCUMENTS

| | | | | |
|---|---|---|---|---|
| JP | 2008-105882 | | 5/2008 | |
| JP | 2009-149463 | | 7/2009 | |
| JP | 2009-173524 | | 8/2009 | |
| JP | 2009-173525 | | 8/2009 | |
| JP | 2010-132349 | | 6/2010 | |
| JP | 2010-215428 | | 9/2010 | |
| SG | 165248 | | 10/2010 | |
| WO | WO2008050606 | * | 5/2008 | C03B 17/06 |
| WO | 2009/081740 | | 7/2009 | |

OTHER PUBLICATIONS

International Preliminary Report on Patentability and Written Opinion of the International Searching Authority issued May 16, 2013 in International (PCT) Application No. PCT/JP2011/073653.

Supplementary European Search Report dated Sep. 3, 2013 in corresponding European Patent Application No. 11834280.7.

* cited by examiner

GLASS FILM RIBBON PRODUCTION METHOD AND GLASS FILM RIBBON PRODUCTION APPARATUS

TECHNICAL FIELD

The present invention relates to a glass film ribbon production method and a glass film ribbon production apparatus. Specifically, the present invention relates to a technical idea for appropriately producing a glass film ribbon having a thickness of 300 μm or less through each step of or each means for forming, annealing, and cutting.

BACKGROUND ART

As is well-known, band-shaped glass ribbons formed by an overflow down-draw method, a slot down-draw method, a float method, a redraw method, or the like are cut into a predetermined dimension and produced as glass substrates having a substantially rectangular shape. In reality, the glass substrates of this type have been used for producing a flat panel display (FPD) typified by a plasma display plate (PDP), a liquid crystal display (LCD), a field-emission display (FED), an organic light-emitting diode (OLED) display, or a solar cell, a secondary battery, or the like.

Under the circumstances, these FPDs and the like have been prompted to reduce in weight, and hence glass substrates to be used as main components of the FPDs and the like are being reduced in thickness. In particular, organic light-emitting diodes are being used not only for a display in which fine three primary colors are allowed to blink by TFTs as in an OLED display, but also for planar light sources such as light sources for an LCD backlight or indoor illumination by emitting light with only a simple color (for example, a white color). Then, in an illumination apparatus of organic light-emitting diodes, a light-emitting surface can be deformed freely if a glass substrate has flexibility. Therefore, the glass substrate to be used in the illumination apparatus is also being promoted to remarkably reduce in thickness from the viewpoint of ensuring sufficient flexibility.

As a method of producing a thin glass substrate to be used for an FPD, an illumination apparatus, or the like, a down-draw method typified by the above-mentioned overflow down-draw method, slot down-draw method, or redraw method is considered to be preferred. Of those down-draw methods, the overflow down-draw method and the slot down-draw method include a forming step of forming a glass ribbon by allowing molten glass to flow down into a band shape (plate shape) from a forming part and cooling both widthwise ends of the band-shaped molten glass with cooling rollers. The redraw method includes a forming step of forming a glass ribbon by softening a glass sheet by re-heating and allowing the softened glass sheet to descend. Then, any of the down-draw methods include an annealing step of removing an internal strain by annealing the glass ribbon inside an annealer while allowing the glass ribbon to descend after executing the forming step, and a cutting step of cutting the glass ribbon after executing the annealing step.

The down-draw method is described in detail. Patent Literature 1 discloses a configuration in which, when the annealing step is executed, a glass ribbon inside an annealer is stretched in a downward direction by tensile rollers provided in the lowermost stage of the annealer. Claim 1 of Patent Literature 1 recites that the thickness of a glass substrate is 0.7 mm or less. However, [0051] and [0053] of this literature respectively describe that the thickness of a widthwise center portion is 0.7 mm and the thickness of the widthwise center portion is 0.63 mm. Therefore, it is understood that the down-draw method described in this literature is directed to the formation of a glass ribbon having a thickness of about 0.6 to 0.7 mm.

Further, Patent Literature 2 discloses a configuration in which, when the annealing step is executed, a glass ribbon inside an annealer is stretched in a downward direction by all the tensile rollers provided in a plurality of stages (three stages) in the vertical direction in the annealer. [0004] and [0042] of this literature describe that the thickness of a glass ribbon (sheet glass) is 0.7 mm, and hence it is understood that the down-draw method described in this literature is directed to the formation of a glass ribbon having a thickness of about 0.7 mm.

Further, Patent Literature 3 and Patent Literature 4 disclose a configuration in which all the tensile rollers provided in a plurality of stages in the vertical direction in an annealer draw a glass ribbon in a downward direction, and all the tensile rollers provided in a plurality of stages in the vertical direction in a cooling chamber present below the annealer also draw the glass ribbon in a downward direction. Each literature does not describe the thickness of a glass substrate or a glass ribbon, but the detailed description of the invention in each literature, substantially, merely describes a glass substrate for a liquid crystal display. Therefore, considering the technical standard at a time of filing of the application, it is understood that the down-draw method described in each literature is also directed to the formation of a glass ribbon having a thickness of about 0.7 mm.

In addition, Patent Literature 5 discloses a configuration in which guide rollers are provided at an interval dimension larger than the thickness of both widthwise ends of a glass ribbon in a plurality of stages in the vertical direction in an annealer, and the glass ribbon is guided downwardly without being held by the guide rollers. The down-draw method described in this literature is directed to the formation of a glass ribbon (glass film ribbon) having a thickness of 500 μm or less, further, a glass ribbon having a thickness of 200 μm or less.

CITATION LIST

Patent Literature 1: JP 2007-51027 A
Patent Literature 2: JP 2001-31435 A
Patent Literature 3: JP 2009-173524 A
Patent Literature 4: JP 2009-173525 A
Patent Literature 5: JP 2008-105882 A

SUMMARY OF INVENTION

Technical Problem

By the way, in recent years, a glass substrate has been substantially reduced in thickness as described above, and hence a glass substrate (glass film) having a thickness of 300 μm or less has been put into practical use. However, in the case of producing this type of glass substrate by the down-draw method described in Patent Literatures 1 to 5 above, the following problems arise.

Specifically, the down-draw method described in Patent Literatures 1 to 4 are directed to the formation of a glass ribbon having a thickness that is well beyond 300 μm, and hence a serious problem does not arise even when the glass ribbon is held by tensile rollers in the annealer. However, if an object to be formed is a glass film ribbon having a thickness of 300 μm or less, the influence of the holding force of the tensile rollers holding the glass film ribbon is large, and invisible minute flaws are generated on front and back surfaces of the glass film ribbon. Consequently, the inconvenience that the glass film ribbon is damaged or broken from the minute flaws may occur.

In this case, according to the down-draw method described in Patent Literatures 3 and 4, although the tensile rollers are also provided in the cooling chamber below the annealer, the tensile rollers in the cooling chamber and the above-mentioned tensile rollers in the annealer have no master-subordinate relationship. That is, the former and the latter are not discriminated from each other in such a manner that any one tensile roller of the former and the latter is set to be a main roller and the other tensile roller thereof is set to be an auxiliary roller. Therefore, all the tensile rollers influence the glass film ribbon by the holding forces substantially equal to each other. As a result, if the thickness of the glass film ribbon is 300 μm or less, the holding force of the tensile rollers in the annealer holding the glass film ribbon cannot be reduced, and the inconvenience such as the generation of the above-mentioned minute flaws and the breakage or the like caused by the minute flaws cannot be avoided.

On the other hand, although the down-draw method described in Patent Literature 5 is directed to the formation of a glass film ribbon having a thickness of 300 μm or less, the glass film ribbon is not held by the guide rollers but merely guided by the guide rollers in the annealer. In this case, an air stream is generated in the annealer by air flowing in the annealer from a lower part, and hence the glass film ribbon is shaken by the air stream because the glass film ribbon is thin, which causes so-called sway. Then, when sway occurs in the glass film ribbon in the annealer as described above, the distance between the heater for keeping the temperature in the annealer and the glass film ribbon becomes unstable, which causes the thermal history of the glass film ribbon to be unstable. Therefore, a serious problem arises in which the function of removing an internal strain is hindered. Further, when sway occurring in the glass film ribbon increases, the glass film ribbon is deformed unreasonably, which may break the glass film ribbon.

Patent Literature 5 describes that the annealing rollers in the lowermost stage in the annealer are used as tensile rollers. However, even in such a case, the above-mentioned problems cannot be avoided reliably. That is, the temperature in the annealer is relatively high, and hence annealing rollers made of ceramics or the like are generally used. If only the annealing rollers of this type are used as tensile rollers, the glass film ribbon cannot be provided with sufficient tension. The reason for this is as follows. In the case of holding the glass film ribbon and providing the glass film ribbon with sufficient tensile action in the annealer, the inappropriateness of a material for the tensile rollers and the like may cause the inconvenience that minute flaws are generated in the glass film ribbon, etc., and hence it is difficult to provide the glass film ribbon with tension to such a degree as to prevent the above-mentioned sway.

In view of the above-mentioned circumstances, it is a technical object of the present invention to avoid a problem caused by sway of a glass film ribbon involved in an air stream generated in an annealer by preventing the generation of minute flaws in the annealer as much as possible, in the case of adopting a down-draw method directed to the formation of a glass film ribbon having a thickness of 300 μm or less.

Solution to Problem

A method according to the present invention, which has been made to achieve the above-mentioned technical object, is a glass film ribbon production method, including the steps of: forming a glass film ribbon while allowing a glass to descend; annealing, after the forming is executed, the glass film ribbon while allowing the glass film ribbon to descend in an annealer to remove an internal strain; cutting, after the annealing is executed, the glass film ribbon having a thickness of 300 μm or less at a center portion excluding both widthwise ends; and main tensile rollers that play a role as principal tensile rollers are holding the descending glass film ribbon, driving and rotating, after the annealing is executed and before the cutting is executed, to thereby provide at least the glass film ribbon in the annealer with tension in a vertical direction. Herein, the above-mentioned "provide the glass film ribbon with tension" means causing the glass film ribbon to be stretched without allowing the glass film ribbon to get loose, irrespective of whether or not to provide the tension to the glass film ribbon. Further, in a strict sense, all the tensile rollers described above and rollers of various types described later are arranged respectively at both widthwise ends of the glass film ribbon and on the front and back sides of the glass film ribbon.

According to the above-mentioned method, after the annealing is executed and before the cutting is executed, that is, on the downstream side with respect to the annealer and on the upstream side with respect to the cutting means in the feed path of the glass film ribbon, main tensile rollers playing a role as principal tensile rollers are arranged, and the main tensile rollers hold the glass film ribbon that descends downwardly from the lower end of the annealer, preferably in a vertical downward direction, and are driven to rotate. As described above, the main tensile rollers are arranged on an outer and lower side of the annealer, and hence it is not necessary to provide rollers playing the same role as that of the main tensile rollers. Thus, in the annealer, the holding force of the rollers does not have a large effect on the glass film ribbon. In other words, in the annealer, the rollers holding the glass film ribbon may be omitted, or the rollers holding the glass film ribbon with a strong force equal to that of the main tensile rollers may not be provided although the rollers holding the glass film ribbon with a force smaller than that of the main tensile rollers may be provided. This prevents damages, breakage, and the like of the glass film ribbon from occurring due to the generation of minute flaws in the annealer. Then, the main tensile rollers arranged on an outer and lower side of the annealer provide the glass film ribbon in the annealer with tension in the vertical direction. Therefore, the sway of the glass film ribbon caused by an air stream does not occur easily. Consequently, the inconvenience can be preferably avoided, in which the appropriate function of removing an internal strain from the glass film ribbon is hindered when the distance between the heater for keeping the temperature in the annealer and the glass film ribbon varies when those members approach each other too closely or separate from each other too farther. The tensile action only by the above-mentioned main tensile rollers may not prevent the sway of the glass film ribbon sufficiently. In such a case, auxiliary tensile rollers may be provided in the annealer. It is important that the holding force of the auxiliary tensile rollers with respect to the glass film ribbon is set to be sufficiently smaller than that of the main tensile rollers to such a degree that a problem does not arise due to the generation of minute flaws in the glass film ribbon.

In this case, it is preferred that the main tensile rollers provide the glass film ribbon with the tension in the vertical direction together with cooling rollers arranged on an outer and upper side of the annealer or rollers arranged in the annealer.

According to the above-mentioned configuration, in the case where the main tensile rollers provide the glass film ribbon with the tension together with the cooling rollers, the glass film ribbon can be provided with the tension over the entire region in the vertical direction inside the annealer. Further, in the case where the main tensile rollers provide the glass film ribbon with the tension together with the rollers provided in the annealer, that is, the rollers set so as to hold the glass film ribbon in the annealer, the glass film ribbon can be provided with the tension in a lower region with respect to the rollers in the annealer. In this case, it is preferred that the rollers be positioned in the vicinity of the upper end in the annealer. For example, in the case where the rollers are provided in a plurality of stages in the vertical direction in the annealer, it is preferred that only the rollers in the uppermost stage be configured to hold the glass film ribbon. Further, in this case, the position of the rollers can be selected or adjusted so as to include a region where sway to be caused by an air stream is likely to be generated in the glass film ribbon in the annealer. In addition, by setting the circumferential velocity of the rollers to be equal to or higher than that of the cooling rollers, a problem caused by the above-mentioned sway can be avoided even between the rollers and the cooling rollers. Note that, in any case, it is important that the holding force by the annealer rollers is set to be smaller than that by the main tensile rollers.

Further, it is preferred that, inside the annealer, guide rollers having an interval dimension larger than a thickness of the glass film ribbon are arranged on front and back sides of the glass film ribbon so as to be opposed to each other.

According to the above-mentioned configuration, a gap is formed between the surface of the glass film ribbon and the guide rollers in the annealer, and the glass film ribbon is not held by the guide rollers. Therefore, the glass film ribbon is allowed to move downwardly and stably while the generation of minute flaws is avoided. In this case, if the rollers are arranged in a plurality of stages in the vertical direction in the annealer, all the rollers may be guide rollers, or all the rollers excluding rollers in one stage (preferably the uppermost stage) may be guide rollers. With such a configuration, in the former case, the glass film ribbon is provided with the tension between the cooling rollers arranged on an outer and upper side of the annealer and the main tensile rollers, and in the latter case, the glass film ribbon is provided with the tension between the rollers in appropriate one stage in the annealer and the main tensile rollers. It is preferred that the guide rollers are driven to rotate so that the circumferential velocity thereof is substantially equal to the descending velocity of the glass film ribbon, from the viewpoint of avoiding the generation of contact flaws in the case where the guide rollers come into contact with the glass film ribbon.

The above-mentioned method may further include the steps of: converting, in a period from a completion of the annealing and a start of the cutting, a direction in which the descending glass film ribbon is fed into a lateral direction; and holding, in a period after the annealing is executed and before the converting a direction is executed, the descending glass film ribbon by the main tensile rollers and driving and rotating the main tensile rollers.

With the above-mentioned configuration, during the converting a direction, that is, when the feed direction of the glass film ribbon is converted from the downward direction into the lateral direction, the forceful direction conversion makes it difficult to provide the glass film ribbon in the annealer with a predetermined force for providing the glass film ribbon with the tension, and there is a possibility that a wave such as pulsing motion may occur in the force. If such a situation occurs, the distance between the heater for keeping the temperature in the annealer and the glass film ribbon varies to become unstable, and the function of removing an internal strain is hindered. For this situation, the main tensile rollers hold the glass film ribbon and are driven to rotate before the converting a direction is executed and after the annealing is executed, and thus, the above-mentioned inconvenience during the converting a direction can be avoided effectively. In this case, in order to respond to a request of preventing an unreasonable extension of the feed path of the glass film ribbon, it is preferred that the main tensile rollers be arranged at a site where the converting a direction is started or in the vicinity thereof.

Further, it is preferred that the main tensile rollers each have an outer circumferential portion that comes into contact with the glass film ribbon at a time of the holding the descending glass film ribbon, the outer circumferential portion being made of a material having hardness lower than hardness of the glass film ribbon.

With the above-mentioned configuration, even when the main tensile rollers hold the solidified glass film ribbon with a strong holding force, the hardness of the main tensile rollers is relatively lower, and hence minute flaws are not generated easily in the glass film ribbon, and a glass film ribbon of high quality can be obtained.

In this case, it is preferred that the outer circumferential portion of each of the main tensile rollers be made of synthetic rubber. The "synthetic rubber" as used herein refers to an elastomer. It is preferred that the coefficient of static friction of the synthetic rubber be 1.00 or more, and the heat-resistant temperature thereof be 300° C. or more.

With the above-mentioned configuration, sliding does not occur easily between the glass film ribbon and the main tensile rollers with the use of synthetic rubber excellent in friction properties. Therefore, it is not necessary to execute a tensile action by providing the glass film ribbon with an unreasonably high contact pressure. This can avoid the situation in which an unnecessary internal stress occurs in the glass film ribbon due to a strong contact pressure. Further, the use of the synthetic rubber excellent in heat resistance enables the main tensile rollers to be arranged at a position as closest as possible to a lower end site of the annealer that is a site at relatively high temperature, and enables the distance between holding portions with respect to the glass film ribbon to be shortened, which is advantageous from the viewpoint of reducing an amplitude of sway caused by an air stream of the glass film ribbon in the annealer.

Further, an apparatus according to the present invention, which has been made in order to achieve the above-mentioned technical object is a glass film ribbon production apparatus, including: forming means for forming a glass film ribbon while allowing a glass to descend; annealing means for annealing the formed glass film ribbon while allowing the formed glass film ribbon to descend in an annealer to remove an internal strain; cutting means for cutting the annealed glass film ribbon having a thickness of 300 μm or less at a center region excluding both widthwise ends; and main tensile rollers that play a role as principal tensile rollers, the main tensile rollers being provided in a middle of a feed path of the glass film ribbon from the annealing means to the cutting means, the main tensile rollers holding the descending glass film ribbon and being driven to rotate, to thereby provide at least the glass film ribbon in the annealer with tension in a vertical direction.

The configuration of the apparatus is substantially the same as that of the aspect described in the beginning of the method according to the present invention. Therefore, the description containing the functional effects is substantially the same as that described above regarding the method.

Advantageous Effects of Invention

As described above, according to the present invention, rollers playing the same role as that of the main tensile rollers may be omitted in the annealer. Therefore, damages, breakage, and the like of the glass film ribbon to be caused by the generation of invisible minute flaws can be avoided, and the sway of the glass film ribbon to be caused by an air stream can be prevented by allowing the main tensile rollers to provide the glass film ribbon in the annealer with tension in the vertical direction. Consequently, the inappropriateness of the function of removing an internal strain to be caused by a variation in the distance between the heater and the glass film ribbon in the annealer can be avoided.

DETAILED DESCRIPTION OF THE INVENTION

Hereinafter, embodiments of the present invention are described with reference to the attached drawings. In the following embodiments, there is described, as an example, an application of the present invention in a case where an overflow down-draw method is adopted for forming a glass film ribbon is illustrated.

Figure 1:
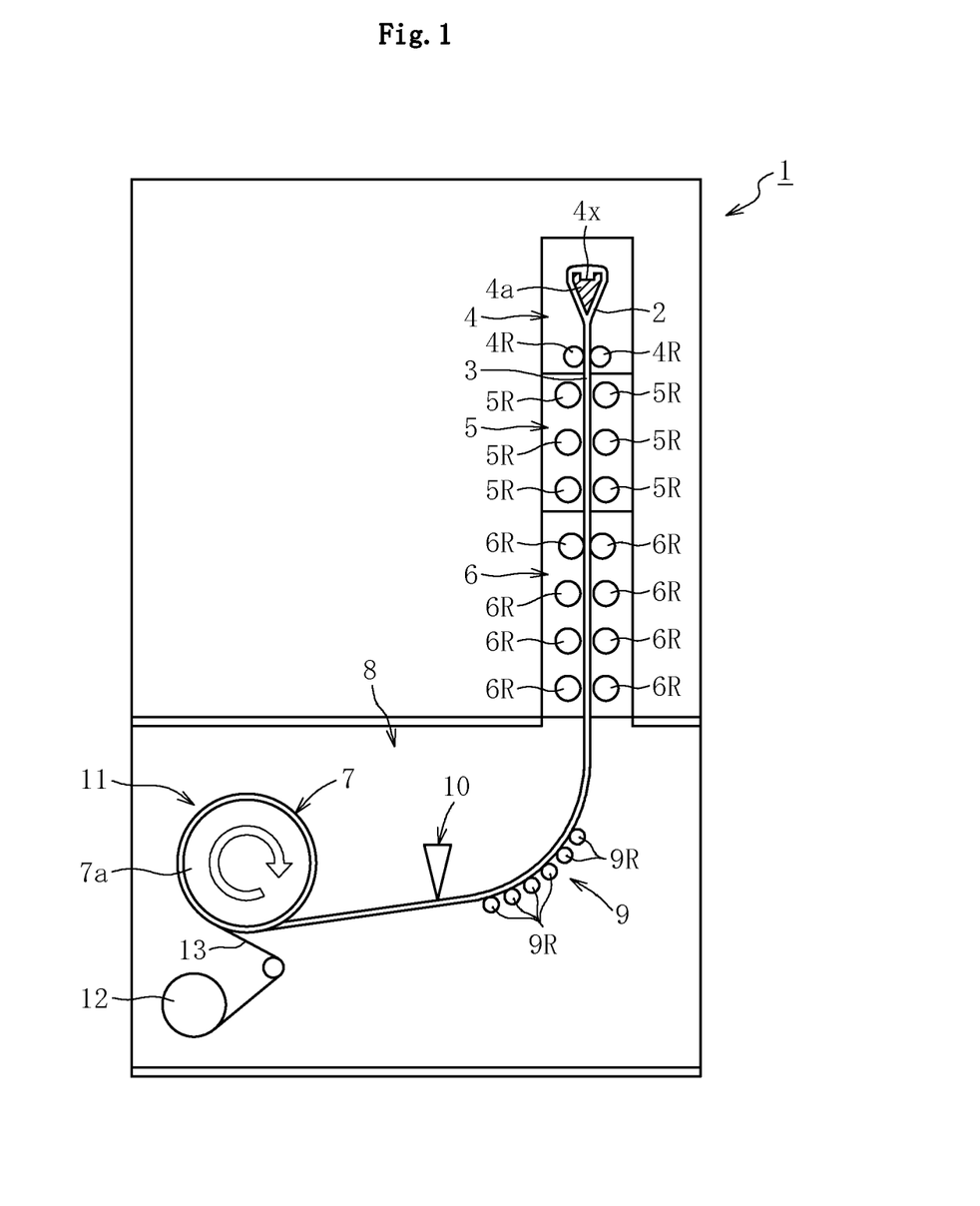
FIG. 1 A schematic vertical cross-sectional side view illustrating an entire configuration of a glass film ribbon production apparatus (status in which a glass film ribbon production method is implemented) according to a first embodiment of the present invention.

FIG. 1 illustrates, as an example, a glass film ribbon production apparatus 1 (status in which a glass film ribbon production method is implemented) according to a first embodiment of the present invention. As illustrated in FIG. 1, the production apparatus 1 includes, as a basic configuration thereof, in an order from the top of FIG. 1, a forming furnace 4 that forms molten glass 2 into a glass film ribbon 3, an annealer (annealing furnace) 5 that anneals the glass film ribbon 3 output from the forming furnace 4 to remove an internal strain, a cooling chamber 6 that cools the glass film ribbon 3 output from the annealer 5, and a cutting chamber 8 that cuts the glass film ribbon 3 output from the cooling chamber 6 in a longitudinal direction to produce a glass roll 7.

The forming furnace 4 contains a forming member 4a having a wedge shape in vertical cross-section and having an overflow groove 4x formed in a top portion thereof, and cooling rollers 4R that cool both widthwise ends of the molten glass 2, which has overflown from the top portion of the forming member 4a into streams joining each other in a lower end portion of the forming member 4a, and simultaneously prevent the molten glass 2 from contracting toward the widthwise center, and form the glass film ribbon 3 while allowing the glass film ribbon 3 to descend. Thus, forming means in the production apparatus 1 includes, as main components, the forming furnace 4, the forming member 4a, and the cooling rollers 4R.

In this case, the cooling roller 4R (also called an edge roller or a knurl roll) is provided with a plurality of convex portions parallel to a roller shaft on an outer circumferential surface thereof to assume a gear shape, and hence, a tensile strength applied outwardly in the width direction acts on both ends of the glass film ribbon 3 from the cooling rollers 4R so as to prevent the glass film ribbon 3 from contracting in the width direction. Therefore, both the widthwise ends of the glass film ribbon 3 are provided with selvage portions having a thickness larger than that of a region on the center side thereof. Then, a region on the widthwise center side of each of the selvage portions is set to be an effective region.

The annealer 5 contains annealing rollers 5R that are arranged in a plurality of stages (three stages in the illustrated example) in the vertical direction and that mainly play a role of guiding the descent of the glass film ribbon 3 output from the forming furnace 4, and heaters (not shown) that are arranged so as to be spaced from each other on both front and back sides of the glass film ribbon 3 and keep the temperature inside the annealer 5 at a certain level. Thus, annealing means in the production apparatus 1 includes, as main components, the annealer 5, the annealing rollers 5R, and the heaters.

In this case, the temperature inside the annealer 5 is about 500° C., and hence the annealing rollers 5R are made of ceramics from a viewpoint of ensuring heat resistance. Then, the annealing rollers 5R are arranged at positions closer to the center side relative to the selvage portions at both the widthwise ends of the glass film ribbon 3. Further, the temperature inside the annealer 5 is set so as to have a predetermined temperature gradient, and thus, the temperature decreases gradually as the glass film ribbon 3 descends, thereby removing an internal strain (thermal strain). Then, inside the annealer 5, air entering from a lower end portion moves upwardly to generate an air stream.

The cooling chamber 6 contains lower rollers 6R, that are arranged in a plurality of stages (four stages in the illustrated example) in the vertical direction and that mainly play a role of allowing the glass film ribbon 3 output from the annealer 5 to descend actively. Thus, cooling means in the production apparatus 1 includes, as main components, the cooling chamber 6 and the lower rollers 6R.

The cutting chamber 8 contains direction converting means 9 that converts the feeding of the glass film ribbon 3 into the feeding in a horizontal direction while curving the glass film ribbon 3 descending after being output from the cooling chamber 6, cutting means 10 that cuts in the longitudinal direction the glass film ribbon 3 that is being fed in the horizontal direction after the direction conversion, and rolling means 11 that rolls the cut glass film ribbon 3 around a roll core 7a. At this time, the thickness of a center portion, excluding the selvage portions, of the glass film ribbon 3 output from the cooling chamber 6 to reach the cutting chamber 8 is 300 µm or less (preferably, 200 µm or less).

In this case, the direction converting means 9 includes a plurality of rollers 9R that are arranged so as to be curved at a predetermined curvature and that support the glass film ribbon 3 with or without contact. The feed direction of the glass film ribbon 3 after the direction conversion by the direction converting means 9 is set to be a horizontal direction or a lateral direction in which the front side in the traveling direction is inclined downwardly. Further, the cutting means 10 is configured to irradiate with a laser beam the front surface side of the glass film ribbon 3 that is being fed in the lateral direction to heat the glass film ribbon 3 locally, and thereafter, to jet cooling water to the heated region from the front surface side, thereby cutting with a laser the glass film ribbon 3 in the longitudinal direction. Further, the rolling means 11 is configured to roll the glass film ribbon 3 around the roll core 7a with a protective sheet 13 drawn from a sheet roll 12 being laminated onto an outer circumferential surface side (back surface side) of the cut glass film ribbon 3, to thereby obtain the glass roll 7.

Figure 2:
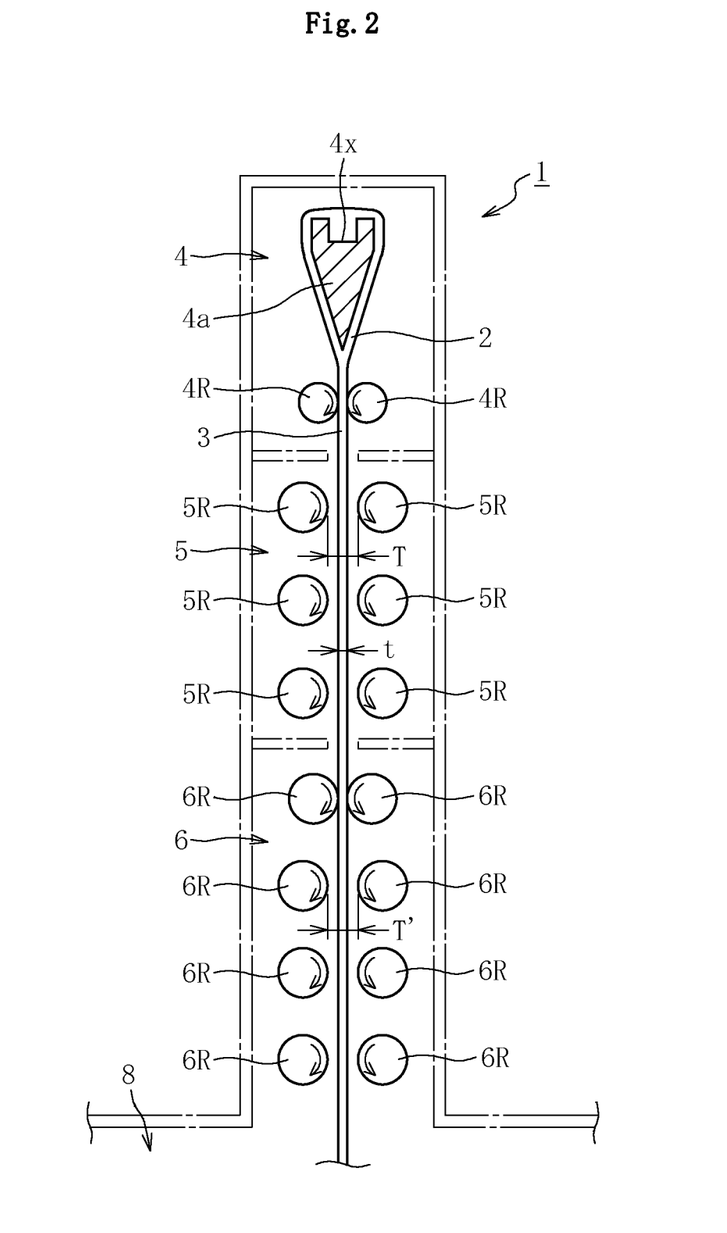
FIG. 2 A schematic vertical cross-sectional side view illustrating a configuration of a main portion of the glass film ribbon production apparatus (status in which the glass film ribbon production method is implemented) according to the first embodiment of the present invention.
Figure 3:
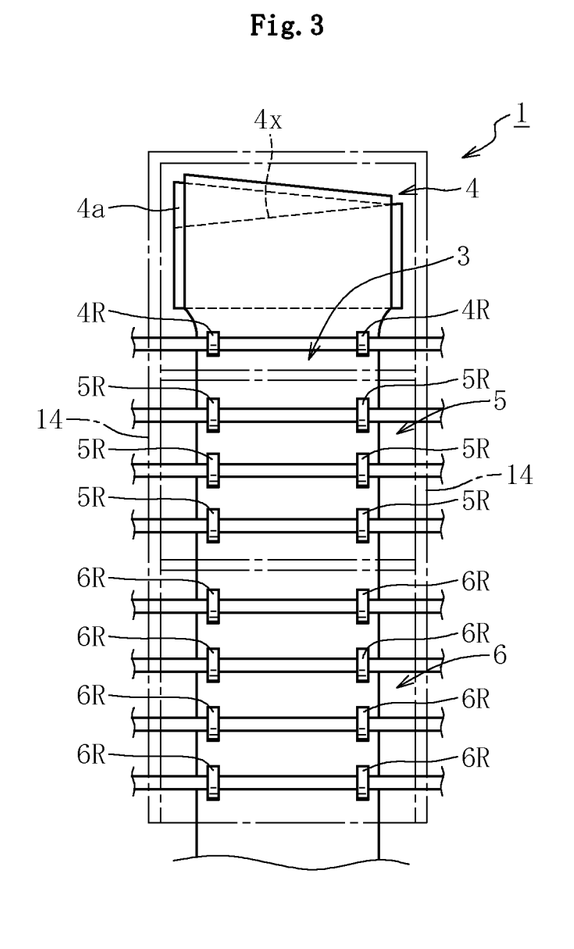
FIG. 3 A schematic front view illustrating the configuration of the main portion of the glass film ribbon production apparatus (status in which the glass film ribbon production method is implemented) according to the first embodiment of the present invention.

Moreover, as illustrated in FIGS. 2 and 3, of the lower rollers 6R arranged in the four stages in the vertical direction inside the cooling chamber 6, the lower rollers 6R in the uppermost stage hold the glass film ribbon 3 descending inside the cooling chamber 6 from the annealer 5, and serves as main tensile rollers. In order to provide tension to the glass film ribbon 3 descending inside the annealer 5, the main tensile rollers 6R are configured to be driven to rotate so that tension in the vertical direction is provided to the glass film ribbon 3 inside the annealer 5 in this embodiment.

Specifically, any of the annealing rollers 5R arranged in the three stages in the vertical direction inside the annealer 5 are basically set to be guide rollers that guide the descent of the glass film ribbon 3 without contact. That is, an interval dimension T between the annealing rollers 5R positioned on both the front and back sides of the glass film ribbon 3 is set to be larger than a thickness t of the glass film ribbon 3 (thickness of the selvage portion). Specifically, gaps between the front and back surfaces of the glass film ribbon 3 and the annealing rollers 5R arranged on both sides of the glass film ribbon 3 are each set to be about 50 to 4,000 µm. Further, the circumferential velocity of each annealing roller 5R is set to be substantially equal to the descending velocity of the glass film ribbon 3.

When the annealing rollers 5R are arranged under the above-mentioned condition, the glass film ribbon 3 is thin, and thus an air stream generated inside the annealer 5 may influence the glass film ribbon 3 to generate sway in the glass film ribbon 3 inside the annealer 5 due to the shake. However, the glass film ribbon 3 is pulled between the main tensile rollers 6R present inside the cooling chamber 6 and the cooling rollers 4R holding the glass film ribbon 3 inside the forming furnace 4, and accordingly the glass film ribbon 3 is stretched inside the annealer 5. In this case, the circumferential velocity of each main tensile roller 6R is set so that the main tensile roller 6R is driven to rotate at a speed substantially equal to or higher than the circumferential velocity of each cooling roller 4R.

In this embodiment, the lower rollers 6R, excluding the main tensile rollers 6R, are set to be guide rollers arranged at an interval dimension T' larger than the thickness t of the glass film ribbon 3. Note that, the main tensile rollers 6R are not limited to the lower rollers 6R in the uppermost stage, and may be lower rollers 6R in the lower stages or lower rollers 6R arranged in a plurality of stages such as two stages or three stages.

Further, in this embodiment, any of the cooling rollers 4R, the annealing rollers 5R, and the lower rollers 6R are mounted in pairs for each roller shaft supported at both ends by wall parts 14 present on both widthwise sides, and are provided at positions on a slightly center side of the selvage portions at both widthwise ends of the glass film ribbon 3 and on both the front and back sides of the glass film ribbon 3. Note that, the rollers 4R, 5R, and 6R may each be cantilever-supported by both the wall parts 14.

Figure 4A:
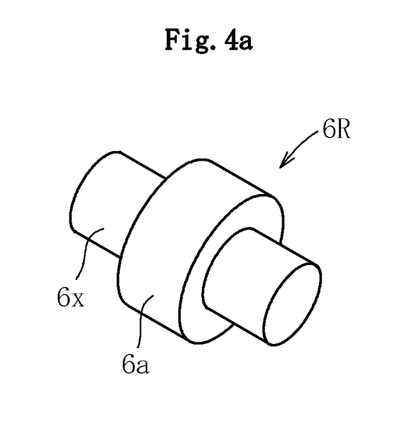
FIG. 4a An enlarged perspective view illustrating an example of a main tensile roller that is a component of the glass film ribbon production apparatus according to the first embodiment of the present invention.

Here, the structure of the main tensile roller 6R is described in detail. As illustrated in FIG. 4a, a cylindrical roller member 6a made of synthetic rubber (elastomer) is fitted and fixed on an outer circumferential side of a roller shaft 6x. Thus, the outer circumferential surfaces of the roller members 6a made of synthetic rubber are configured to come into contact with the front and back surfaces of the glass film ribbon 3 to apply a holding force thereto. Although the synthetic rubber has hardness lower than that of glass, physical properties such as hardness, flexibility, and surface smoothness thereof can be controlled appropriately. Therefore, the synthetic rubber can be easily used as a material capable of holding the glass film ribbon 3 accurately. If the synthetic rubber is used for the main tensile roller 6R (roller member 6a), sliding between the main tensile roller 6R and the glass film ribbon 3 can be eliminated, and the glass film ribbon 3 can be stably provided with tension inside the annealer 5.

According to the usage of the synthetic rubber constituting the roller member 6a in this embodiment, it is preferred that its coefficient of static friction with respect to glass be 1.00 or more. If such synthetic rubber is used, the main tensile rollers 6R can hold the glass film ribbon 3 appropriately while reliably preventing sliding between the outer circumferential portions of the main tensile rollers 6R and the front and back surfaces of the glass film ribbon 3. Therefore, it is not necessary to apply a large contact pressure on the front and back surfaces of the glass film ribbon 3, which can avoid to the extent possible an inconvenience that an undesired internal stress is generated in the glass film ribbon 3. Note that, numerical values of the above-mentioned coefficient of static friction are measured at room temperature by a method (so-called inclination method) in which $\tan \theta$ is set to be the coefficient of static friction where $\theta$ represents an angle of the glass sheet when the synthetic rubber material starts sliding under a state in which a glass sheet with the synthetic rubber material arranged thereon is inclined gradually.

Further, under the arrangement condition of the main tensile rollers 6R in this embodiment, it is preferred that the heat-resistant temperature of the synthetic rubber be 300° C. or more. That is, the main tensile rollers 6R can play their roles wherever the main tensile rollers 6R are arranged as long as the main tensile rollers 6R are arranged on an outer and lower side of the annealer 5. However, as the main tensile rollers 6R are arranged close to the annealer 5 as possible, the distance between holding parts can be shortened, which is advantageous from a viewpoint of providing the glass film ribbon 3 with appropriate tension inside the annealer 5. In this case, the temperature of the glass film ribbon 3 immediately after being output from the annealer 5 is 250° C. or more. Therefore, in the case of using synthetic rubber having a low heat-resistant temperature (for example, nitrile rubber, acrylic rubber, urethane rubber, ethylene propylene rubber, butyl rubber, and epichlorohydrin rubber), in order to prevent thermal deformation of the outer circumferential portion of the roller members 6a that come into contact with the glass film ribbon 3, there are the following restriction: an apparatus for cooling the outer circumferential portion thereof or the like is required separately, or the main tensile rollers 6R need to be arranged at sites where the temperature of the glass film ribbon 3 is lowered sufficiently, that is, sites far away from the annealer 5.

However, if the synthetic rubber having a heat-resistant temperature of 300° C. or more as described above is used, it is not necessary to provide the cooling apparatus or the like separately or set the arrangement position of the main tensile rollers 6R to be unreasonably farther from the annealer 5. Here, the heat-resistant temperature refers to the highest temperature in a range in which synthetic rubber can maintain its physical properties at room temperature without being deformed by heat and without having unnecessary adhesiveness due to heat. Considering the above-mentioned points, it is preferred to use silicone rubber or fluorocarbon rubber as the synthetic rubber of the roller member 6a. Note that, even synthetic rubber having a low heat-resistant temperature such as nitrile rubber as described above can exhibit sufficient effects, depending upon the usage thereof.

Figure 4B:
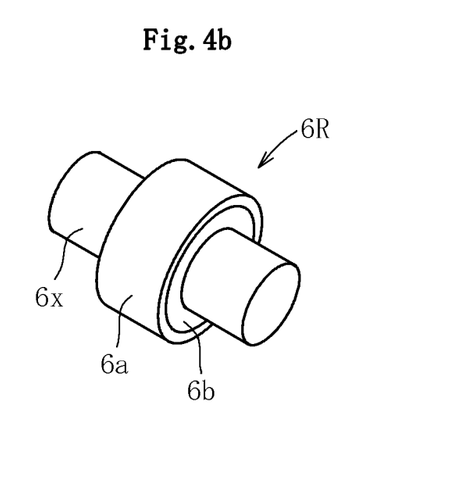
FIG. 4b An enlarged perspective view illustrating another example of the main tensile roller that is a component of the glass film ribbon production apparatus according to the first embodiment of the present invention.

FIG. 4b illustrates another structure of the main tensile roller 6R in detail, in which a cylindrical core portion 6b is fitted and fixed on an outer circumferential side of the roller shaft 6x and a cylindrical roller member 6a made of synthetic rubber is fitted and fixed on an outer circumferential side of the core portion 6b. Even in a case of such a structure, synthetic rubber forming the roller members 6a comes into contact with both the front and back surfaces of the glass film ribbon 3. The characteristics and advantages of the synthetic rubber are the same as those described with reference to FIG. 4a, and hence descriptions thereof are omitted herein.

Next, the function of the production apparatus 1 (production method) according to the first embodiment of the present invention having the above-mentioned configuration is described.

As the glass film ribbon production method, first, a forming step is executed in which molten glass is formed into the glass film ribbon 3 and allowed to descend by the main functions of the forming member 4a and the cooling rollers 4R inside the forming furnace 4. After that, an annealing step is executed in which an internal strain is removed from the glass film ribbon 3 while the glass film ribbon 3 is guided to descend by the annealing rollers (guide rollers) 5R inside the annealer 5. After that, a cooling step is executed in which the glass film ribbon 3 after being subjected to the annealing step is pulled downwardly and guided by the inner rollers 6R inside the cooling chamber 6 and thus is cooled to room temperature. After that, a direction conversion step is executed in which the feed direction of the glass film ribbon 3 is converted from the downward direction to the lateral direction inside the cutting chamber 8, and thereafter, a cutting step is executed in which the selvage portions of the glass film ribbon 3 are cut off. Further, after that, the glass film ribbon 3 from which the selvage portions have been removed is rolled around the roll core 7a with the protective sheet 13 laminated on the glass film ribbon 3 by the rolling means 11, and thus, the glass roll 7 is obtained.

In this case, during the execution of the annealing step, the glass film ribbon 3 inside the annealer 5 is provided with tension between the cooling rollers 4R inside the forming furnace 4 and the main tensile rollers 6R inside the cooling chamber 6 over the entire region of the glass film ribbon 3. Therefore, in spite of the fact that the air stream is generated inside the annealer 5, it is difficult for the shake and sway to be generated in the glass film ribbon 3. Then, the outer circumferential surface of the main tensile roller 6R is formed of synthetic rubber, and hence the glass film ribbon 3 inside the annealer 5 can be provided with tension in a stable state without giving minute flaws to the glass film ribbon 3 inside the cooling chamber 6 and without causing the sliding therein.

The coefficient of static friction of the synthetic rubber forming the roller members 6a of the main tensile rollers 6R is 1.00 or more, and hence the main tensile rollers 6R can reliably hold the glass film ribbon 3 without causing the sliding. Hence, the glass film ribbon 3 inside the annealer 5 can be reliably provided with tension to such a degree that the sway is not caused with respect to the glass film ribbon 3.

Further, all the annealing rollers 5R inside the annealer 5 are guide rollers, and the circumferential velocity thereof is substantially equal to the descending velocity of the glass film ribbon 3. Therefore, even when the glass film ribbon 3 comes into contact with the annealing rollers 5R during its descent, the generation of the minute flaws caused by the contact can be suppressed to the extent possible. Note that, the annealing rollers 5R are made of ceramics having high hardness in terms of the temperature inside the annealer 5, but all the annealing rollers 5R are guide rollers and the circumferential velocity thereof is appropriate as described above, and hence the annealing rollers 5R do not become a factor for generating the minute flaws to the glass film ribbon 3.

Though the above-mentioned operations, a problem such as breakage caused by the generation of the minute flaws in the glass film ribbon 3 is prevented effectively, and a situation is avoided in which the sway is generated in the glass film ribbon 3 due to the influence of the air stream generated inside the annealer 5. This prevents a thermal hysteresis of the glass film ribbon 3 from being unstable by the generation of the sway inside the annealer 5, as well as avoiding a situation in which the function of removing the internal strain is hindered, for example, when the glass film ribbon 3 approaches the heaters inside the annealer 5 too closely or moves away therefrom too much. Thus, the execution of the annealing step is set remarkably appropriate.

Figure 5:
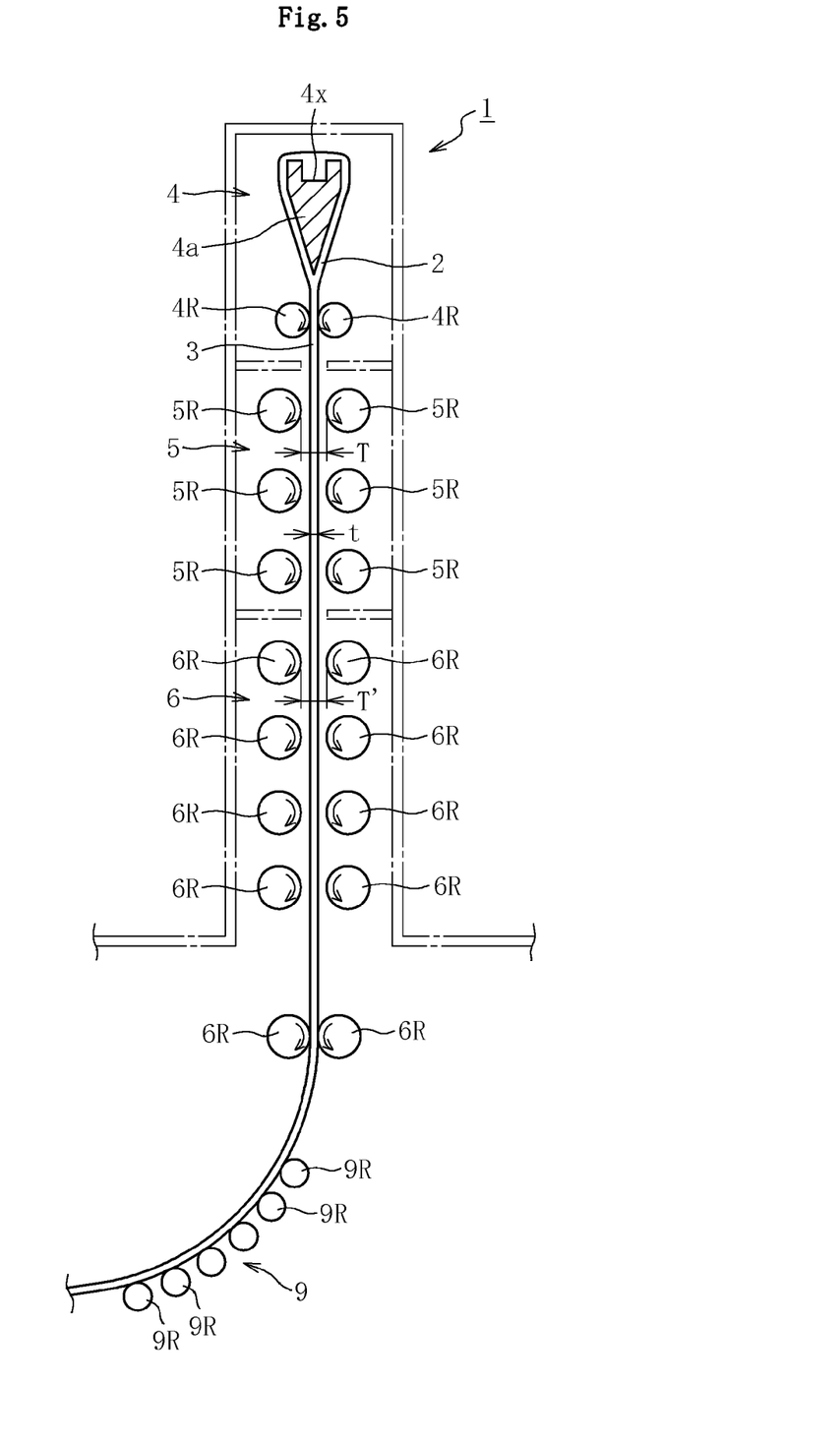
FIG. 5 A schematic vertical cross-sectional side view illustrating a configuration of a main portion of a glass film ribbon production apparatus (status in which the glass film ribbon production method is implemented) according to a second embodiment of the present invention.

FIG. 5 illustrates, as an example, a glass film ribbon production apparatus 1 (status in which a glass film ribbon production method is implemented) according to a second embodiment of the present invention. The production apparatus 1 according to the second embodiment is different from that of the above-mentioned first embodiment in that the main tensile rollers 6R are arranged below the cooling chamber 6 and before the position where the direction converting means 9 starts converting the direction of the glass film ribbon 3 (in the illustrated example, at the start point of the direction conversion or in the vicinity thereof). Note that, the main tensile rollers may be arranged inside the cooling chamber 6, but it is important that the main tensile rollers 6R are arranged before the position where the direction conversion of the glass film ribbon 3 is started, preferably at the start point of the direction conversion or in the vicinity thereof.

According to such a configuration, the glass film ribbon 3 is not held inside the annealer 5. Therefore, even when a wave is generated in the glass film ribbon 3 during the tensile action due to the forceful direction conversion, the wave is eliminated by the function of the main tensile rollers 6R, and the glass film ribbon 3 inside the annealer 5 can also be provided with tension. Further, if the main tensile rollers 6R are arranged at the start point of the direction conversion of the glass film ribbon 3 or in the vicinity thereof, the feed path of the glass film ribbon 3 can be shortened to the extent possible, and the production apparatus can be reduced in space.

The other configurations and functional effects of the second embodiment are the same as those of the above-mentioned first embodiment, and hence the components common to both the embodiments are denoted by the identical reference numerals, and the descriptions thereof are omitted.

In the above-mentioned first and second embodiments, the glass film ribbon 3 inside the annealer 5 is provided with tension between the cooling rollers 4R and the main tensile rollers 6R. However, the annealing rollers 5R in the uppermost stage arranged inside the annealer 5 may hold the glass film ribbon 3 so as to provide the glass film ribbon 3 inside the annealer 5 with tension between the annealing rollers 5R and the main tensile rollers 6R. In this case, it is important to set the circumferential velocity of the annealing rollers 5R in the uppermost stage to be identical to or higher than the circumferential velocity of the cooling rollers 4R, and also to set the circumferential velocity of the main tensile rollers 6R to be identical to or higher than the circumferential velocity of the annealing rollers 5R in the uppermost stage. Further, the annealing rollers 5R holding the glass film ribbon 3 inside the annealer 5 are not limited to those in the uppermost stage and may be annealing rollers 5R in a stage lower than the uppermost stage. However, it is important to set the relationship among the respective circumferential velocities of the annealing rollers 5R, the cooling rollers 4R, and the main tensile rollers to be identical to that in the above-mentioned case.

Further, in the above-mentioned first and second embodiments, only the main tensile rollers 6R are arranged as tensile rollers. However, auxiliary tensile rollers having a holding force smaller than that of the main tensile rollers 6R and having a circumferential velocity equal to that of the main tensile rollers 6R may be arranged inside the annealer 5, for example.

Further, in the above-mentioned first and second embodiments, the present invention is applied to the case where the overflow down-draw method is adopted for forming the glass film ribbon, but the present invention can be similarly applied even to a case where a slot down-draw method or a redraw method is adopted. Note that, in the case of adopting the redraw method, the arrangement position of the above-mentioned cooling rollers correspond to the unheated position of the glass sheet, which is a base material.

Further, in the above-mentioned first and second embodiments, the glass film ribbon 3 is cut along a longitudinal direction using laser cutting in the cutting step so as to obtain the glass roll 7. However, scribing may be performed along the width direction of the glass film ribbon 3, and the glass film ribbon 3 may be cut using the scribe as a base line so as to obtain glass films as a plurality of glass substrates.

REFERENCE SIGNS LIST 1 glass film ribbon production apparatus
2 molten glass
3 glass film ribbon
4 forming furnace
4R cooling roller
5 annealer
5R annealing roller (guide roller)
6 cooling chamber
6a synthetic rubber
6R main tensile roller (lower roller)
7 glass roll
9 direction converting means
10 cutting means

The invention claimed is:
1. A glass film ribbon production method, comprising:
  forming a glass film ribbon while allowing a glass to descend;
  annealing, after the forming is executed, the glass film ribbon while allowing the glass film ribbon to descend in an annealer to remove an internal strain;
  cutting, after the annealing is executed, the glass film ribbon having a thickness of 300 µm or less at a center portion excluding both widthwise ends; and
  holding the descending glass film ribbon with cooling rollers located above and outside of the annealer, auxiliary tensile rollers located inside the annealer, and main tensile rollers located below and outside of the annealer, wherein
  the main tensile rollers, driven to rotate, hold the glass film ribbon after the annealing and before the cutting,
  a force by which the auxiliary tensile rollers hold the glass film ribbon is smaller than a force by which the main tensile rollers hold the glass film ribbon, and
  the glass film ribbon is provided with tension in a vertical direction between the main tensile rollers and the auxiliary tensile rollers.

2. The glass film ribbon production method according to claim 1, wherein, inside the annealer, guide rollers are arranged on front and back sides of the glass film ribbon so as to be opposed to each other, a space between the opposed guide rollers being greater than a thickness of the glass film ribbon.

3. The glass film ribbon production method according to claim 1, further comprising:
  converting, in a period from a completion of the annealing to a start of the cutting, a direction in which the descending glass film ribbon is fed into a lateral direction,
  wherein the main tensile rollers are located upstream of the converting of the direction.

4. The glass film ribbon production method according to claim 1, wherein the main tensile rollers each have an outer circumferential portion that comes into contact with the glass film ribbon at a time of the holding the descending glass film ribbon, the outer circumferential portion being made of a material having a hardness that is lower than a hardness of the glass film ribbon.

5. The glass film ribbon production method according to claim 4, wherein the outer circumferential portion of each of the main tensile rollers is made of synthetic rubber.

6. The glass film ribbon production method according to claim 2, further comprising:
  converting, in a period from a completion of the annealing to a start of the cutting, a direction in which the descending glass film ribbon is fed into a lateral direction,
  wherein the main tensile rollers are located upstream of the converting of the direction.

7. The glass film ribbon production method according to claim 2, wherein the main tensile rollers each have an outer circumferential portion that comes into contact with the glass film ribbon at a time of the holding the descending glass film ribbon, the outer circumferential portion being made of a material having a hardness that is lower than a hardness of the glass film ribbon.

8. The glass film ribbon production method according to claim 3, wherein the main tensile rollers each have an outer circumferential portion that comes into contact with the glass film ribbon at a time of the holding the descending glass film ribbon, the outer circumferential portion being made of a material having a hardness that is lower than a hardness of the glass film ribbon.

9. The glass film ribbon production method according to claim 6, wherein the main tensile rollers each have an outer circumferential portion that comes into contact with the glass film ribbon at a time of the holding the descending glass film ribbon, the outer circumferential portion being made of a material having a hardness that is lower than a hardness of the glass film ribbon.

10. The glass film ribbon production method according to claim 7, wherein the outer circumferential portion of each of the main tensile rollers is made of synthetic rubber.

* * * * *